(12) United States Patent
Guo et al.

(10) Patent No.: US 10,146,088 B2
(45) Date of Patent: Dec. 4, 2018

(54) BACKLIGHT MODULE, LIQUID CRYSTAL DISPLAY DEVICE AND BACKLIGHT ADJUSTMENT METHOD THEREOF

(71) Applicant: Wuhan China Star Optoelectronics Technology Co., Ltd., Wuhan, Hubei (CN)

(72) Inventors: Xingling Guo, Guangdong (CN); Bin Xiong, Guangdong (CN); Man Li, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 321 days.

(21) Appl. No.: 14/909,109

(22) PCT Filed: Jan. 14, 2016

(86) PCT No.: PCT/CN2016/070917
§ 371 (c)(1),
(2) Date: Jan. 30, 2016

(87) PCT Pub. No.: WO2017/107269
PCT Pub. Date: Jun. 29, 2017

(65) Prior Publication Data
US 2017/0322453 A1    Nov. 9, 2017

(30) Foreign Application Priority Data

Dec. 22, 2015   (CN) .......................... 2015 1 0969996

(51) Int. Cl.
*G02F 1/1335*   (2006.01)
*F21V 8/00*     (2006.01)

(52) U.S. Cl.
CPC ..... *G02F 1/133621* (2013.01); *G02B 6/0051* (2013.01); *G02B 6/0053* (2013.01);
(Continued)

(58) Field of Classification Search
CPC ... G02F 1/133621; G02F 2001/133614; G02B 6/0073; G02B 6/0068; G02B 6/0083; G02B 6/0055; G02B 6/0051; G02B 6/0053
See application file for complete search history.

(56) References Cited

U.S. PATENT DOCUMENTS 9,772,702 B2 *   9/2017   Kurokawa ............ G06F 3/0412
2011/0069094 A1 *  3/2011   Knapp ................. G09G 3/2003
                                                       345/690

FOREIGN PATENT DOCUMENTS

CN   101876409 A   11/2010
CN   203478016 U    3/2014
(Continued)

*Primary Examiner* — Charles Hicks
(74) *Attorney, Agent, or Firm* — Andrew C. Cheng

(57) ABSTRACT

The present invention provides a backlight module, a liquid crystal display device and a backlight adjustment method thereof; the backlight module comprises a light guide plate and a LED light bar located at an incident side of the light guide plate, and the LED light bar comprises a driving chip, LED lamps of at least two different color temperatures, which are alternately aligned, and the LED lamps of the same color temperature are coupled in series to construct a route, and each route is coupled to an adjustable resistance in series, and the routes constructed by the LED lamps after parallel connection are all coupled to the driving chip to construct a driving circuit, and the backlight module further comprises a control module, and the control module is coupled to the driving circuit.

7 Claims, 3 Drawing Sheets

(52) U.S. Cl.
    CPC ......... *G02B 6/0055* (2013.01); *G02B 6/0068*
        (2013.01); *G02B 6/0073* (2013.01); *G02B*
        *6/0083* (2013.01); *G02F 2001/133614*
                                (2013.01)

(56) References Cited

FOREIGN PATENT DOCUMENTS

| | | |
|---|---|---|
| CN | 104036734 A | 9/2014 |
| CN | 104676389 A | 6/2015 |
| CN | 104916235 A | 9/2015 |
| JP | 2008-262823 A | 10/2008 |

* cited by examiner

BACKLIGHT MODULE, LIQUID CRYSTAL DISPLAY DEVICE AND BACKLIGHT ADJUSTMENT METHOD THEREOF

CROSS REFERENCE

This application claims the priority of Chinese Patent Application No. 201510969996.1, entitled "Backlight module, liquid crystal display device and backlight adjustment method thereof", filed on Dec. 22, 2015, the disclosure of which is incorporated herein by reference in its entirety.

FIELD OF THE INVENTION

The present invention relates to a display skill field, and more particularly to a backlight module, a liquid crystal display device and a backlight adjustment method thereof.

BACKGROUND OF THE INVENTION

In the liquid crystal panel structure of utilizing RGBW pixel arrangement, the corresponding color resists act as RGB in the CF substrate, and the transparent filling up material OC acts as white W. The effects of the three colors, red, green, blue shown by the liquid crystal panel are respectively determined with the RGB, three kinds of color resists and the backlight. The white effect shown by the liquid crystal panel is determined with two kinds of conditions. One is the red, green, blue color resists+the backlight, and the other is the OC+the backlight. The NTSC (color gamut) of the liquid crystal panel, and the color temperature of the liquid crystal panel and the white dot color coordinate are the important considerate factors in the product design. However, the color temperature and the white dot of the red, green, blue color resists+the backlight are not equal to the color temperature and the white dot of the OC+the backlight. Consequently, the color temperature of the designed and produced liquid crystal panel has significant difference from the color temperature in the beginning of the design to result in the condition of color temperature and white dot color coordinate drifts. The color expression of the designed liquid crystal panel is not up to standard, and the color temperature difference is large.

SUMMARY OF THE INVENTION

The embodiment of the present invention provides a backlight module and a liquid crystal display device, for realizing the objective of adjustable accuracy of a color temperature and a white dot color coordinate of a liquid crystal display.

The present invention further provides a backlight adjustment method.

For realizing the aforesaid objective, the technical solution provided by the embodiments of the present invention is:

The present invention provides a backlight module, and the backlight module comprises a light guide plate and a LED light bar located at an incident side of the light guide plate, and the LED light bar comprises a driving chip, LED lamps of at least two different color temperatures, which are aligned in spaces, and the LED lamps of the same color temperature are coupled in series to construct a route, and each route is coupled to an adjustable resistance in series, and the routes constructed by the LED lamps after parallel connection are all coupled to the driving chip to construct a driving circuit, and the backlight module further comprises a control module, and the control module is coupled to the driving circuit.

The LED lamps have two color temperatures, and the LED lamps comprise first LED lamps and second LED lamps, and the first LED lamps and the second LED lamps are alternately aligned, and the color temperature of the first LED lamps is higher than the color temperature of the second LED lamps; the adjustable resistance comprises a first adjustable resistance and a second adjustable resistance, and the first adjustable resistance is coupled to the first LED lamps in series to construct a first route, and the second adjustable resistance is coupled to the second LED lamps in series to construct a second route.

The first LED lamps and the second LED lamps are coated with phosphors of the same thickness and different concentrations or the same concentration and different thicknesses.

The backlight module further comprises a prismatic glass, a diffuser and a reflector, and the prismatic glass, the diffuser, the light guide plate and the reflector are stacked up in order, and the prismatic glass and the diffuser are located at an illuminating light direction of the light guide plate.

The present invention further provides a liquid crystal display device, wherein the liquid crystal display device comprises a backlight module and a liquid crystal panel, and the liquid crystal panel and the backlight module are stacked up;

the backlight module comprises a light guide plate and a LED light bar located at an incident side of the light guide plate, and the LED light bar comprises a driving chip, LED lamps of at least two different color temperatures, which are alternately aligned, and the LED lamps of the same color temperature are coupled in series to construct a route, and each route is coupled to an adjustable resistance in series, and the routes constructed by the LED lamps after parallel connection are all coupled to the driving chip to construct a driving circuit, and the backlight module further comprises a control module, and the control module is coupled to the driving circuit.

The LED lamps have two color temperatures, and the LED lamps comprise first LED lamps and second LED lamps, and the color temperature of the first LED lamps is higher than the color temperature of the second LED lamps; the adjustable resistance comprises a first adjustable resistance and a second adjustable resistance, and the first adjustable resistance is coupled to the first LED lamps in series to construct a first route, and the second adjustable resistance is coupled to the second LED lamps in series to construct a second route.

The present invention further provides a backlight adjustment method of a liquid crystal display device, wherein the backlight adjustment method of the liquid crystal display device comprises:
  determining a color temperature and a white dot color coordinate for display of the liquid crystal display;
  the control module adjusts the adjustable resistance of the each route to change a current value flowing through the LED lamps of the route according to the color temperature and the white dot color coordinate for display.

A resistance value of the first adjustable resistance is turned down, and a resistance value of the second adjustable resistance is turned up to raise the color temperature of the liquid crystal display device and to lower a drift of the white dot color coordinate.

A resistance value of the first adjustable resistance is turned up, and a resistance value of the second adjustable resistance is turned down to lower the color temperature of the liquid crystal display device and to lower a drift of the white dot color coordinate.

In the backlight module, the liquid crystal display device and the backlight adjustment method thereof according to the present invention, by alternately arranging the LED light sources of different color temperatures, and coupling the adjustable resistance with the LED light source circuit in series to set the resistance for current restriction, the matching ratio of LEDs of different temperature colors is controlled to achieve the adjustable accuracy of the color temperature and the white dot color coordinate of the liquid crystal display.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are merely part of embodiments of the present invention, but not all embodiments. Based on the embodiments of the present invention, all other embodiments to those of ordinary skill in the premise of no creative efforts obtained, should be considered within the scope of protection of the present invention.

Figure 1:
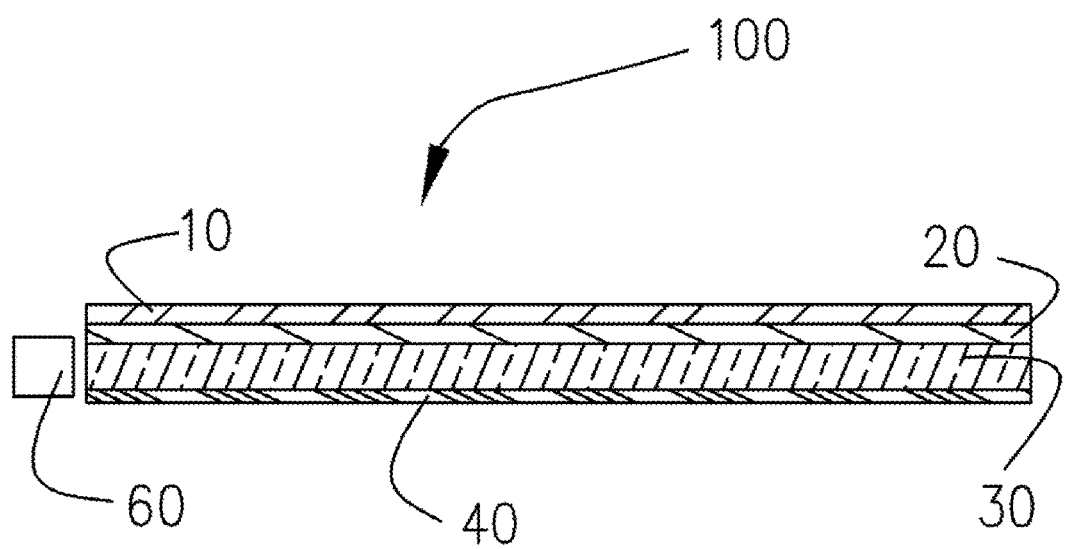
FIG. 1 is a longitudinal section diagram of a backlight module provided by the embodiment of the present invention.
Figure 2:
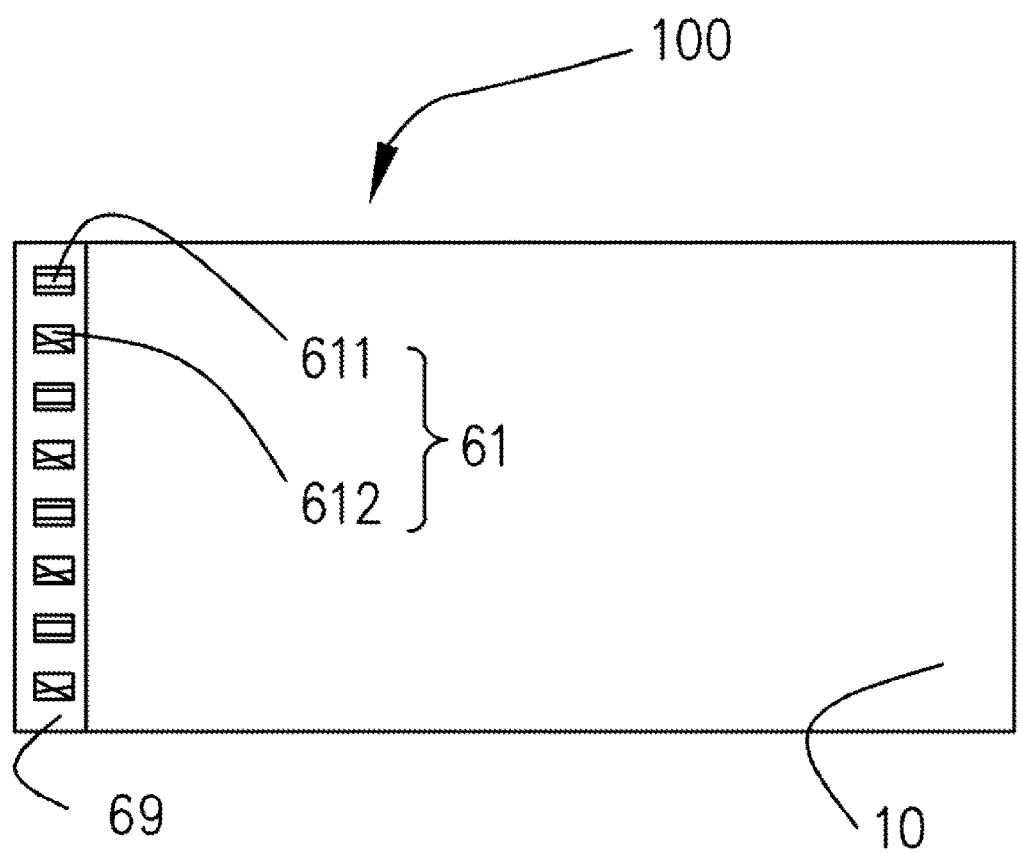
FIG. 2 is a transverse section diagram of the backlight module in FIG. 1.

Please refer to FIG. 1 and FIG. 2, together. The embodiment of the present invention provides a backlight module 100. The backlight module 100 comprises prismatic glass 10, a diffuser 20, a light guide plate 30, a reflector 40 and an LED light bar 60. The prismatic glass 10, the diffuser 20, the light guide plate 30 and the reflector 40 are stacked up in order. The prismatic glass 10 and the diffuser 20 are located at an illuminating light direction of the light guide plate 30. The LED light bar 60 is right in front of the lateral side of the light guide plate 30.

Figure 3:
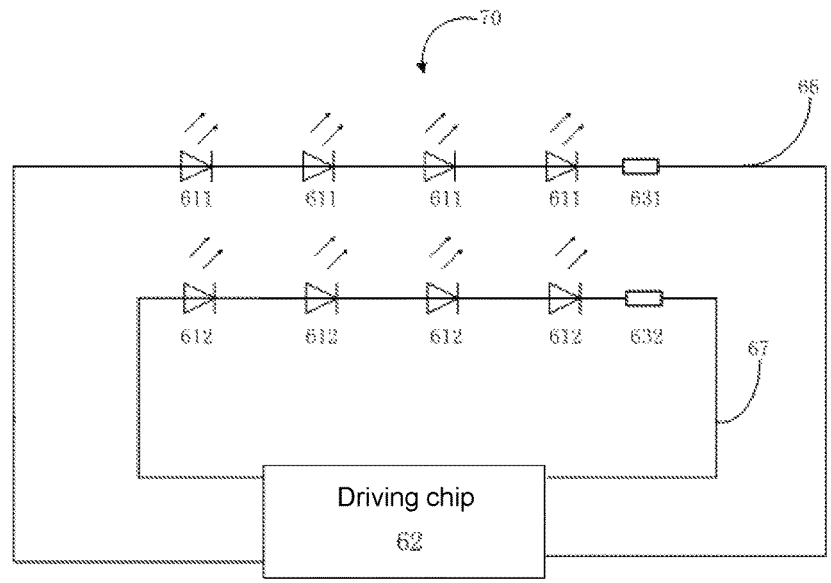
FIG. 3 is a driving circuit principle diagram of an LED lamps of the backlight module in FIG. 1.

Please refer to FIG. 2 and FIG. 3, together. Furthermore, the LED light bar 60 comprises a substrate 69, LED lamps 61 of at least two different color temperatures, a driving chip 62 and a plurality of adjustable resistances. The amount of the LED lamps 61 is 8 to 12. The LED lamps 61 of different color temperatures are alternately aligned on the substrate 69. The LED lamps 61 of the same color temperature are coupled in series to construct a route, and each route is coupled to an adjustable resistance in series, and the routes constructed by the LED lamps after parallel connection are coupled to the driving chip 62 to construct a driving circuit. The backlight module further comprises a control module (not shown), and the control module is coupled to the driving circuit. The control module can control the resistance change of the adjustable resistance in the driving circuit.

In this embodiment, the LED lamps 61 have two kinds of color temperatures. The LED lamps 61 comprise first LED lamps 611 and second LED lamps 612. The color temperature of the first LED lamps 611 is higher than the color temperature of the second LED lamps 612. The different color temperatures of the first LED lamps 611 and the second LED lamps 612 can be realized by coating phosphors of the same concentration and different thicknesses or phosphors of the different concentrations and the same thickness. Specifically, as the first LED lamps 611 and the second LED lamps 612 have the phosphors of the same concentration and different thicknesses, the phosphor thickness of the first LED lamps 611 is smaller than the phosphor thickness of the second LED lamps 612; as the first LED lamps 611 and the second LED lamps 612 have the phosphors of the different concentrations and the same thickness, the phosphor concentration of the first LED lamps 611 is smaller than the phosphor concentration of the second LED lamps 612.

Please refer to FIG. 2, again. Furthermore, the first LED lamps 611 and the second LED lamps 612 are alternately aligned on the substrate. In this embodiment, the amount of the first LED lamps 611 is four, and the amount of the second LED lamps 612 is four. The four first LED lamps 611 are coupled in series to construct a first route 66, and the four second LED lamps 612 are coupled in series to construct a second route 67.

Furthermore, the adjustable resistances comprise a first adjustable resistance 631 and a second adjustable resistance 632. The first adjustable resistance 631 and the four first LED lamps 611 are coupled in series in the first route 66. The second adjustable resistance 632 and the four second LED lamps 612 are coupled in series in the second route 67. After parallel connection, the first route 66 and the second route 67 are coupled with the driving chip 62 to construct the driving circuit 70. The driving circuit 70 can adjust the color temperature of the backlight module 100.

The present invention further provides a liquid crystal display device, and the liquid crystal display device comprises a backlight module 100 and a liquid crystal panel, and the backlight module 100 and the liquid crystal panel are stacked up. The color temperature and the white dot color coordinate of the liquid crystal display device can be adjusted with the driving circuit of the backlight module 100.

Figure 4:
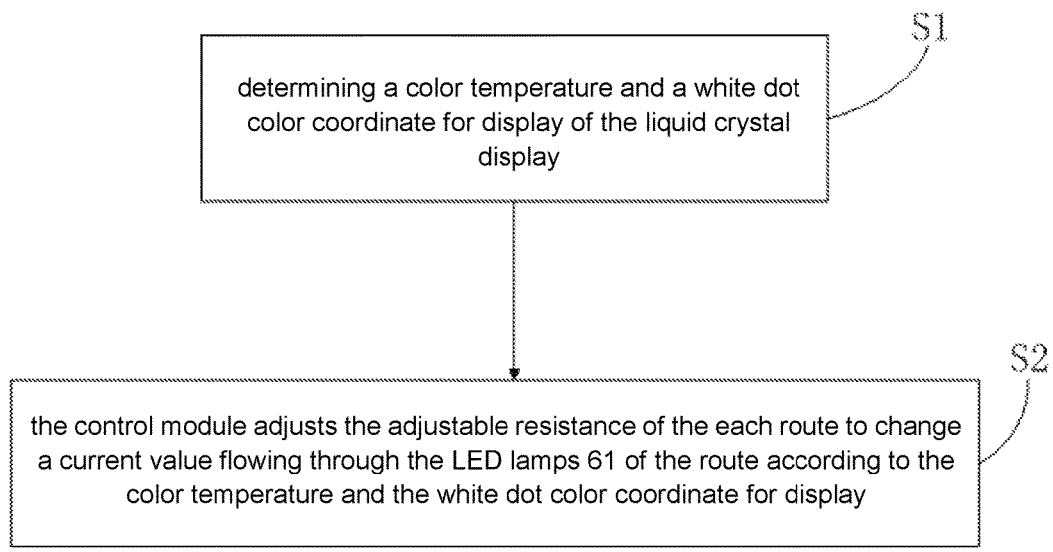
FIG. 4 is a flowchart diagram of a backlight adjustment method of a liquid crystal display device provided by the embodiment of the present invention.

Please refer to FIG. 4. The present invention further provides a backlight adjustment method of the liquid crystal display device as aforementioned to realize the adjustable color temperature and white dot color coordinate of the liquid crystal display device. The backlight adjustment method of the liquid crystal display device comprises:

step S1, determining a color temperature and a white dot color coordinate for display of the liquid crystal display;

step S2, the control module adjusts the adjustable resistance of the each route to change a current value flowing through the LED lamps 61 of the route according to the color temperature and the white dot color coordinate for display.

When the color temperature of the liquid crystal display device for display is under and the white dot color coordinate is larger, the resistance value of the first adjustable resistance 631 is turned down to raise the current value flowing through the first LED lamps 611; meanwhile, the resistance value of the second adjustable resistance 632 is turned up to reduce the current value flowing through the second LED lamps 612. Thus, the entire color temperature of the liquid crystal display device is biased to the color temperature of the first LED lamps 611, i.e. the high color temperature to raise the color temperature of the liquid crystal display device and to lower a drift of the white dot color coordinate.

When the color temperature of the liquid crystal display device for display is higher and the white dot color coordinate is larger, the resistance value of the first adjustable resistance 631 is turned up to reduce the current value flowing through the first LED lamps 611; meanwhile, the resistance value of the second adjustable resistance 632 is turned down to raise the current value flowing through the second LED lamps 612. Thus, the entire color temperature of the liquid crystal display device is biased to the color temperature of the second LED lamps 612, i.e. the low color temperature to reduce the color temperature of the liquid crystal display device and to lower a drift of the white dot color coordinate.

With the adjustable resistances coupled in series in the driving circuit, the resistance can be fine tuned and current restricted to control the driving current of the LED lamps 61. Thus, the brightness of the LED lamps 61 is precisely adjusted to realize precise adjustments of the color temperature and the white dot color coordinate of the liquid crystal display device.

Above are embodiments of the present invention, which does not limit the scope of the present invention. Any modifications, equivalent replacements or improvements within the spirit and principles of the embodiment described above should be covered by the protected scope of the invention.

What is claimed is:

1. A backlight module of a liquid crystal display device, wherein the backlight module comprises a light guide plate and a LED light bar located at an incident side of the light guide plate, and the LED light bar comprises a driving chip, LED lamps of at least two different color temperatures, which are aligned in spaces, and the LED lamps of the same color temperature are coupled in series to construct a route, and each route is coupled to an adjustable resistance in series, and the routes constructed by the LED lamps after parallel connection are all coupled to the driving chip to construct a driving circuit, and the backlight module further comprises a control module, and the control module is coupled to the driving circuit, wherein the LED lamps have two color temperatures, and the LED lamps comprise first LED lamps and second LED lamps, and the first LED lamps and the second LED lamps are alternately aligned, and the color temperature of the first LED lamps is higher than the color temperature of the second LED lamps; the adjustable resistance comprises a first adjustable resistance and a second adjustable resistance, and the first adjustable resistance is coupled to the first LED lamps in series to construct a first route, and the second adjustable resistance is coupled to the second LED lamps in series to construct a second route, wherein the control module adjusts the first adjustable resistance to implement current restriction to the first LED lamps and adjusts the second adjustable resistance to implement current restriction to the second LED lamps to control a matching ratio of the first LED lamps and the second LED lamps to achieve an adjustable accuracy of a color temperature and a white dot color coordinate of the liquid crystal display.

2. The backlight module according claim 1, wherein the first LED lamps and the second LED lamps are coated with phosphors of the same thickness and different concentrations or the same concentrations and different thicknesses.

3. The backlight module according claim 1, wherein the backlight module further comprises a prismatic glass, a diffuser and a reflector, and the prismatic glass, the diffuser, the light guide plate and the reflector are stacked up in order, and the prismatic glass and the diffuser are located at an illuminating light direction of the light guide plate.

4. A liquid crystal display device, wherein the liquid crystal display device comprises a backlight module and a liquid crystal panel, and the liquid crystal panel and the backlight module are stacked up;

the backlight module comprises a light guide plate and a LED light bar located at an incident side of the light guide plate, and the LED light bar comprises a driving chip, LED lamps of at least two different color temperatures, which are alternately aligned, and the LED lamps of the same color temperature are coupled in series to construct a route, and each route is coupled to an adjustable resistance in series, and the routes constructed by the LED lamps after parallel connection are all coupled to the driving chip to construct a driving circuit, and the backlight module further comprises a control module, and the control module is coupled to the driving circuit, wherein the LED lamps have two color temperatures, and the LED lamps comprise first LED lamps and second LED lamps, and the first LED lamps and the second LED lamps are alternately aligned, and the color temperature of the first LED lamps is higher than the color temperature of the second LED lamps; the adjustable resistance comprises a first adjustable resistance and a second adjustable resistance, and the first adjustable resistance is coupled to the first LED lamps in series to construct a first route, and the second adjustable resistance is coupled to the second LED lamps in series to construct a second route, wherein the control module adjusts the first adjustable resistance to implement current restriction to the first LED lamps and adjusts the second adjustable resistance to implement current restriction to the second LED lamps to control a matching ratio of the first LED lamps and the second LED lamps to achieve an adjustable accuracy of a color temperature and a white dot color coordinate of the liquid crystal display.

5. A backlight adjustment method of a liquid crystal display device, wherein a backlight module comprises a light guide plate and a LED light bar located at an incident side of the light guide plate, and the LED light bar comprises LED lamps of two different color temperatures, and the LED lamps comprise first LED lamps and second LED lamps, and the first LED lamps and the second LED lamps are alternately aligned, and the color temperature of the first LED lamps is higher than the color temperature of the second LED lamps; the adjustable resistance comprises a first adjustable resistance and a second adjustable resistance, and the first adjustable resistance is coupled to the first LED lamps in series to construct a first route, and the second adjustable resistance is coupled to the second LED lamps in series to construct a second route, wherein the backlight adjustment method of the liquid crystal display device comprises:

determining a color temperature and a white dot color coordinate for display of the liquid crystal display device;

the control module adjusts the first adjustable resistance to implement current restriction to the first LED lamps and adjusts the second adjustable resistance to implement current restriction to the second LED lamps to change a current value flowing through the first LED lamps of the first route and a current value flowing through the second LED lamps of the second route to control a matching ratio of the first LED lamps and the second LED lamps according to the color temperature and the white dot color coordinate for display.

6. The backlight adjustment method of the liquid crystal display device according to claim 5, wherein a resistance value of the first adjustable resistance is turned down, and a resistance value of the second adjustable resistance is turned up to raise the color temperature of the liquid crystal display device and to lower a drift of the white dot color coordinate.

7. The backlight adjustment method of the liquid crystal display device according to claim 5, wherein a resistance value of the first adjustable resistance is turned up, and a resistance value of the second adjustable resistance is turned down to lower the color temperature of the liquid crystal display device and to lower a drift of the white dot color coordinate.

* * * * *